United States Patent
Ibrahim et al.

(10) Patent No.: US 12,330,969 B1
(45) Date of Patent: Jun. 17, 2025

(54) METHOD OF CATALYTIC DEGRADATION OF PHENYLBUTAZONE WITH ZEROVALENT CERIUM SUPPORTED BIOCHAR BEADS

(71) Applicant: IMAM MOHAMMAD IBN SAUD ISLAMIC UNIVERSITY, Riyadh (SA)

(72) Inventors: Ahmed Bayoumi Mohamed Ibrahim, Riyadh (SA); Murtaza Sayed, Peshawar (PK); Maleeha Bushra, Peshawar (PK); Faiza Rehman, Peshawar (PK); Mohamed Nady Abd El-Hameed Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/034,263

(22) Filed: Jan. 22, 2025

(51) Int. Cl.
| | |
|---|---|
| *C02F 1/72* | (2023.01) |
| *B01J 21/18* | (2006.01) |
| *B01J 23/10* | (2006.01) |
| *B01J 35/40* | (2024.01) |
| *B01J 35/45* | (2024.01) |

(Continued)

(52) U.S. Cl.
CPC ............. *C02F 1/725* (2013.01); *B01J 21/18* (2013.01); *B01J 23/10* (2013.01); *B01J 35/40* (2024.01); *B01J 35/45* (2024.01); *B01J 35/613* (2024.01); *B01J 35/643* (2024.01); *B01J 35/647* (2024.01); *B01J 37/031* (2013.01); *B01J 37/04* (2013.01); *C02F 1/722* (2013.01); *C02F 2101/34* (2013.01); *C02F 2101/38* (2013.01)

(58) Field of Classification Search
None
See application file for complete search history.

(56) References Cited

U.S. PATENT DOCUMENTS

| | | | |
|---|---|---|---|
| 6,455,018 B1 * | 9/2002 | Cuif | C22B 11/04 |
| | | | 423/28 |
| 12,049,436 B2 * | 7/2024 | Lee | C01G 23/08 |

(Continued)

FOREIGN PATENT DOCUMENTS

| | | |
|---|---|---|
| CN | 111001413 A | 4/2020 |
| CN | 113171777 A | 7/2021 |
| CN | 115722251 A | 3/2023 |

OTHER PUBLICATIONS

Ana Carolina Lopes Oliveira, "Treatment of Liquid Pharmaceutical Industry Effluents by Fenton's Processes.", University of Coimbra, Sep. 2012, 73 pages.

(Continued)

*Primary Examiner* — John J Figueroa
(74) *Attorney, Agent, or Firm* — Oblon, McClelland, Maier & Neustadt, L.L.P.

(57) ABSTRACT

A method of catalytic degradation of phenylbutazone in water includes contacting a catalyst and an oxidant with an aqueous solution comprising phenylbutazone. The catalyst comprises zerovalent cerium supported on biochar beads and the oxidant is a persulfate. The method includes degrading the phenylbutazone during contacting to form a degradation mixture including one or more degradation products. An amount of phenylbutazone in the degradation mixture is 15 to 20 wt. % of an amount of phenylbutazone in the aqueous solution.

20 Claims, 10 Drawing Sheets

(51) Int. Cl.
  *B01J 35/61* (2024.01)
  *B01J 35/64* (2024.01)
  *B01J 37/03* (2006.01)
  *B01J 37/04* (2006.01)
  *C02F 101/34* (2006.01)
  *C02F 101/38* (2006.01)

(56) References Cited

U.S. PATENT DOCUMENTS

| | | |
|---|---|---|
| 2003/0103892 A1* | 6/2003 | Niu ................... B01J 23/8993 |
| | | 502/302 |
| 2018/0265386 A1 | 9/2018 | Geng et al. |
| 2019/0271676 A1 | 9/2019 | Geng et al. |

OTHER PUBLICATIONS

Jibran Iqbal, et al., "Efficient removal of norfloxacin using nano zerovalent cerium composite biochar-catalyzed peroxydisulfate.", Journal of Cleaner Production, vol. 377, Dec. 1, 2022, 134405, 7 pages.

* cited by examiner

METHOD OF CATALYTIC DEGRADATION OF PHENYLBUTAZONE WITH ZEROVALENT CERIUM SUPPORTED BIOCHAR BEADS

BACKGROUND

Technical Field

The present disclosure is directed towards industrial adsorbents, water purification materials and methods of purifying water, and more particularly, relates to a method of catalytic degradation of phenylbutazone (PBZ) in an aqueous solution using a catalyst and adsorbent comprising zerovalent cerium supported biochar beads.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Pharmaceuticals and medicinal agents are polluting natural aquatic environments, including wastewater and surface waters, raising large environmental and public health concerns. Contaminants originate from pharmaceutical manufacturing processes, improper disposal of unused medications, agricultural runoff, and/or excretion of unmetabolized drugs by humans and animals. Contaminants in aquatic systems persist due to high chemical stability of the contaminants and associated resistance to natural degradation, leading to toxicity, bioaccumulation, and risks to human and animal health through contaminated water sources. Water treatment protocols are used for wastewater purification.

Conventional wastewater treatment methods, including activated sludge processes, filtration, and/or sedimentation, are often ineffective in eliminating contaminants due to the structural complexity and stability of the contaminants. As a result, methods are being developed for effective removal of pharmaceutical contaminants aiming to produce clean water from wastewater sources that may be toxic to living organisms. Advanced treatment technologies, including membrane filtration, ozonation, and advanced oxidation processes may be employed to address challenges in wastewater treatment; however, such methods are limited by high energy consumption, secondary pollution, and elevated operational costs, rendering the advanced treatment technologies unsuitable for widespread implementation.

To overcome shortcomings of current methods, there is a need for developing and implementing sustainable methods that are economical, environmentally sustainable, and may achieve complete degradation of pharmaceuticals in water. Limitations underscore the need for alternative and more effective methods for treating pharmaceutical pollutants in water. Phenylbutazone (PBZ, $C_{19}H_{20}N_2O_2$) is among one of the most common pharmaceuticals used in the last 50 years; however, many recalcitrant chemicals including PBZ, are not degraded by conventional techniques. Medically used compounds that are toxic and/or not eco-friendly need attention to be eliminated from aqueous medium. Catalytic degradation using advanced materials represents a desirable alternative to degrade and/or eliminate medically used compounds from water sources. Catalytic materials offer high efficiency in breaking down pharmaceutical compounds into non-toxic by-products under mild reaction conditions, addressing limitations of traditional approaches while promoting environmental safety. Catalytic treatment methods enhance removal efficiency of pharmaceuticals without drawbacks, such as high operational costs, generation of toxic by-products, and/or energy-intensive processes.

Advanced oxidation and reduction processes (AOPs) were introduced to address challenges of removing stubborn and non-biodegradable contaminants from water. AOPs employ effective radicals, such as sulphate radicals ($SO_4^{-}\cdot$) and/or hydroxyl radicals (OH·), to break down pollutants that are difficult to degrade, making them easier to remove and/or transform into less harmful substances; however, AOPs come with drawbacks including energy-intensive operation and maintenance input, which may result in increased operational costs, especially in large-scale applications. The chemicals used in some AOPs, such as hydrogen peroxide or ozone, may be economically taxing, adding to the overall treatment costs. AOPs are effective in degrading pollutants; however, the AOP treatment process may produce secondary pollutants and/or toxic by-products, which may require further treatment. Challenges remain in addressing aquatic pollution caused by pharmaceutical contaminants; therefore, existing technologies have a need to be refined in order to achieve effective and sustainable solutions for water decontamination processes.

Accordingly, an object of the present disclosure is to provide a method of catalytic degradation of phenylbutazone in water with zerovalent cerium supported biochar beads that may circumvent drawbacks and limitations, such high cost, incomplete degradation, formation of toxic by-products, high economical aspect, and limited applicability in large-scale applications, of methods known in the art.

SUMMARY

In an exemplary embodiment, a method of catalytic degradation of phenylbutazone in water is described. The method includes contacting a catalyst and an oxidant with an aqueous solution comprising phenylbutazone. The catalyst is zerovalent cerium supported on biochar beads and the oxidant is a persulfate. The method further includes degrading the phenylbutazone during the contacting to form a degradation mixture including one or more degradation products. An amount of phenylbutazone in the degradation mixture is 15 to 20 wt. % of an amount of phenylbutazone in the aqueous solution.

In some embodiments, the catalyst is in the form of particles having a diameter of 0.05 to 0.6 micrometers (μm).

In some embodiments, the catalyst is porous and has an average pore diameter of 1 to 5 nanometers (nm).

In some embodiments, the catalyst has a surface area of 55 to 60 square meter per gram ($m^2/g$).

In some embodiments, the one or more degradation products are selected from a group consisting of benzene ($C_6H_6$), pentane ($C_5H_{12}$), butane ($C_4H_{10}$), propane ($C_3H_8$), propionamide ($C_3H_7NO$), acetamide ($C_2H_5NO$), ethanamine ($C_2H_7N$), acetaldehyde ($C_2H_4O$), N-methylformohydrazine ($CH_5N_3O$), and 1-methylhydrazine ($CH_6N_2$).

In some embodiments, the aqueous solution has a pH of 2 to 12.

In some embodiments, an amount of the catalyst is 130 to 150 milligrams per liter (mg $L^{-1}$) of the aqueous solution.

In some embodiments, a concentration of the oxidant is 0.1 to 0.3 millimolar (mM).

In some embodiments, 55 to 60% of an initial amount of the catalyst is stable up to a temperature of 600° C. by thermogravimetric analysis.

In some embodiments, the catalyst is not irradiated with light during the contacting.

In some embodiments, at least 60 wt. % of an initial amount of the phenylbutazone is degraded within 1 minute of contacting.

In some embodiments, at least 80 wt. % of an initial amount of the phenylbutazone is degraded within 5 minutes of contacting.

In some embodiments, the aqueous solution further includes one or more salts.

In some embodiments, the aqueous solution has a pH of 6 to 9.

In some embodiments, the degrading occurs with a hydroxyl radical and/or a sulfate radical intermediate.

In some embodiments, the catalyst is made by a process including mixing a quinoa biochar, a hydroxyapatite, a sodium alginate, and a zerovalent cerium in a solvent for 1 hour to 4 hours to form a slurry. The process further includes adding the slurry to an aqueous solution, where the aqueous solution includes calcium chloride, and stirring the aqueous solution to form the catalyst.

In some embodiments, the zerovalent cerium is prepared by a borohydride reduction of a cerium salt.

In some embodiments, the cerium salt is cerium sulfate $(Ce(SO_4)_2)$.

In some embodiments, adding the slurry to the aqueous solution is done dropwise with a syringe.

In some embodiments, a distance between a nozzle of the syringe and a surface of the aqueous solution is 1 to 5 centimeters (cm).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "catalyst" refers to a substance that speeds up a chemical reaction without being consumed in the process. Catalysts may include, but are not limited to, homogeneous catalysts, heterogeneous catalysts, enzymes, acid catalysts, base catalysts, photochemical catalysts, electrocatalysts, and biocatalysts.

As used herein, the term "oxidant" refers to a substance that gains, accepts, or receives electrons in a chemical reaction, causing another substance to lose electrons and be oxidized. Common examples of oxidants include, but are not limited to, oxygen, hydrogen peroxide, and persulfates.

As used herein, the term "slurry" refers to the mixture of solid particles suspended in a liquid, typically water. A slurry has a thick, semi-fluid consistency and is used in various industrial processes, such as mining, construction, and chemical manufacturing (i.e., synthesis). The solid particles in a slurry are not fully dissolved but are dispersed in the liquid, allowing the mixture to flow while retaining a high concentration of solids.

As used herein, the term "surface area" refers to the total area of an exposed surface of a material per unit of mass or volume. It is typically measured in square meters per gram ($m^2/g$) and is a parameter for characterizing adsorption capacity, reactivity, and porosity of a material, such as a nanocomposite. Surface area provides insights into how well a material can interact with other substances, such as phenylbutazone, in a solution.

A weight percent of a component, unless specifically stated to the contrary, is based on a total weight of the formulation and/or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to degradation of phenylbutazone (PBZ) in water with zerovalent cerium (ZVCe) immobilized on biochar (quinoa) beads (ZVCe-biochar beads). The present disclosure also describes synthesis of the ZVCe-biochar beads (also referred to as ZVCe/biochar, ZVCe/biochar beads, and a ZVCe/biochar composite). In the degradation of PBZ in water with the ZVCe-biochar beads, good mobility of the ZVCe-biochar beads, easy separation of the ZVCe-biochar beads and a solution, and fast degradation of the PBZ in an aqueous solution is noted.

Figure 1A:
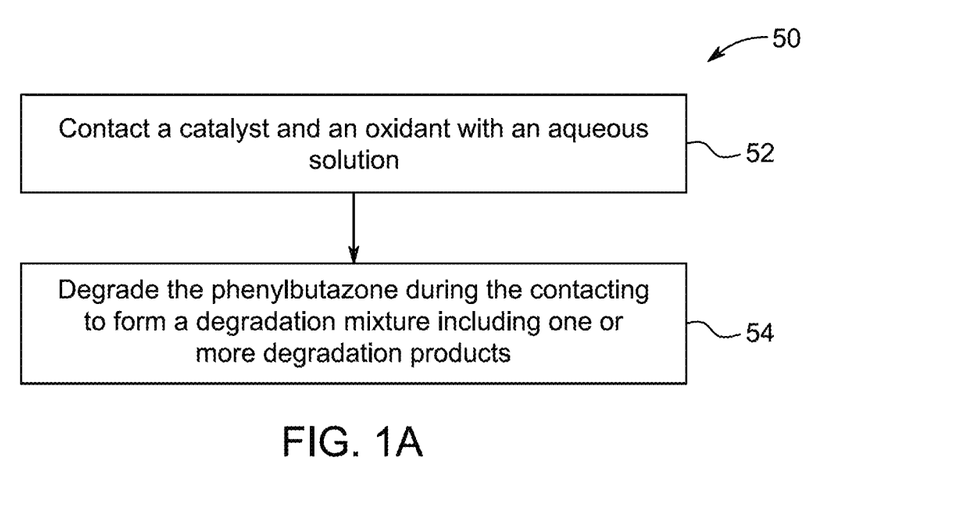
FIG. 1A is a flow chart depicting a method of catalytic degradation of phenylbutazone (PBZ) in water, according to certain embodiments.

FIG. 1A illustrates a schematic flow chart of a method 50 of catalytic degradation of phenylbutazone in water. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure. Catalytic degradation of phenylbutazone refers to a process in which a catalyst, such as zerovalent cerium supported on biochar and/or another catalytic material, accelerates the breakdown of phenylbutazone into simpler, less harmful compounds. In this process, the catalyst facilitates chemical reaction by generating reactive species, such as hydroxyl radicals and/or sulfate radicals, which attack phenylbutazone molecules. These reactive species break the structure of phenylbutazone, leading to its degradation into smaller, less toxic fragments. Catalytic degradation of phenylbutazone may be used in environmental applications, such as wastewater treatment, to remove pharmaceutical contaminants and any other contaminants from water systems.

At step 52, the method 50 includes contacting a catalyst and an oxidant with an aqueous solution. The catalyst is zerovalent cerium supported biochar beads. Cerium, with its ability to easily change oxidation states, provides catalytic activity in redox reactions. Biochar, a porous, carbon-rich material, serves as a stable support, enhancing the catalyst's surface area and preventing the cerium from deactivating. This combination offers a sustainable, cost-effective, and durable catalyst. In some embodiments, the catalyst is in the form of particles having a diameter of 0.05 to 0.6 µm, preferably 0.1 to 0.57 µm, preferably 0.2 to 0.55 µm, preferably 0.3 to 0.53 µm, preferably 0.4 to 0.51 µm, more preferably 0.45 to 0.5 µm, and yet more preferably about 0.49 µm. In some embodiments, the catalyst is in the form of spherical particles. An advantage of spherical particles is that spheres possess minimum surface area amongst all geometric shapes. In some embodiments, the catalyst may be in the form of other geometric particles including, but not limited to, circular, polygonal, triangular, and/or rectangular particles.

In some embodiments, the catalyst is porous and has an average pore diameter of 1 to 5 nm, preferably 2 to 4 nm, more preferably 2.5 to 3.5 nm, and yet more preferably about 2.89 to 3.2 nm. In some embodiments, the catalyst has a surface area of 55 to 60 $m^2/g$, preferably 56 to 59 $m^2/g$, more preferably 57 to 58.5 $m^2/g$, and yet more preferably about 58.027 $m^2/g$. In some embodiments, the amount of the catalyst is 130 to 150 mg per liter of the aqueous solution (mg/L), preferably 132 to 148 mg/L, preferably 135 to 145 mg/L, and preferably 137 to 143 mg/L. In some embodiments, the oxidant may include, but is not limited to, hydrogen peroxide, ozone, chlorine, potassium permanganate, persulfate, sodium hypochlorite, Fenton's reagent, copper (II) sulfate, nitrogen dioxide, peracetic acid, a combination thereof, and the like. In a preferred embodiment, the oxidant is a persulfate. In an embodiment, the concentration of the oxidant is 0.1 to 0.3 mM, preferably 0.15 to 0.25 mM, more preferably 0.18 to 0.22 mM, and yet more preferably about 0.2 mM. In some embodiments, 55 to 60 wt. %, preferably 56 to 59 wt. %, and preferably 57 to 58 wt. % of an initial amount of the catalyst is stable up to a temperature of 600° C. by thermogravimetric analysis.

The catalyst and the oxidant are contacted with the aqueous solution. The aqueous solution comprises phenylbutazone. In some embodiments, the aqueous solution further includes one or more salts. In some embodiments, the one or more salts may include, but are not limited to, sodium chloride, potassium chloride, calcium chloride, sodium nitrate, potassium nitrite, calcium carbonate, sodium bicarbonate, potassium bicarbonate, and the like. In other embodiments, the aqueous solution may further include one or more compounds that are not salts. The aqueous solution has a pH of 2 to 12, preferably 4 to 11, preferably 5 to 10, preferably 6 to 9, more preferably 7 to 8.5, and yet more preferably about 8. In some embodiments, the catalyst is not irradiated with light. A benefit of a catalyst not being irradiated with light is that it eliminates a need for energy-consuming light sources, making the process more cost-effective and sustainable. Without a need for light irradiation, the catalyst can operate under ambient conditions, reducing operational costs and energy consumption.

At step 54, the method 50 includes degrading the phenylbutazone during the contacting to form a degradation mixture including one or more degradation products. In some embodiments, the mechanism of phenylbutazone degradation occurs with a hydroxyl radical and/or a sulfate radical. The degradation of phenylbutazone may involve hydroxyl and/or sulfate radicals. These radicals may attack phenylbutazone through hydrogen abstraction, electron transfer, and/or addition reactions. Hydroxyl radicals are more likely to cause hydrogen abstraction or addition, while sulfate radicals are more likely to induce electron transfer. These radicals lead to cleavage of phenylbutazone aromatic rings and the formation of smaller products and/or degradation products like pentane, butane, and propane, along with other byproducts. The process breaks down phenylbutazone, demonstrating effectiveness of radical-driven degradation. In an embodiment, the one or more degradation products are selected from a group consisting of phenylbutazone, benzene, pentane, butane, propane, propionamide, acetamide, ethanamine, acetaldehyde, N-methylformohydrazine, and 1-methylhydrazine. The amount of phenylbutazone in the degradation mixture is 15 to 20 wt. %, preferably 16 to 19 wt. %, and preferably 17 to 18 wt. % of an amount of phenylbutazone in the aqueous solution.

In some embodiments, at least 60 wt. %, preferably 62 to 65 wt. %, more preferably 63 to 64.5 wt. %, and yet more preferably about 64.03 wt. % of an initial amount of the phenylbutazone is degraded within 1 minute of contacting the catalyst and the oxidant with the aqueous solution. In another embodiment, at least 80 wt. %, preferably 81 to 84 wt. %, more preferably 82 to 83 wt. %, and yet more preferably about 82.65 wt. % of an initial amount of the phenylbutazone is degraded within 5 minutes of contacting the catalyst and the oxidant with the aqueous solution.

Figure 1B:
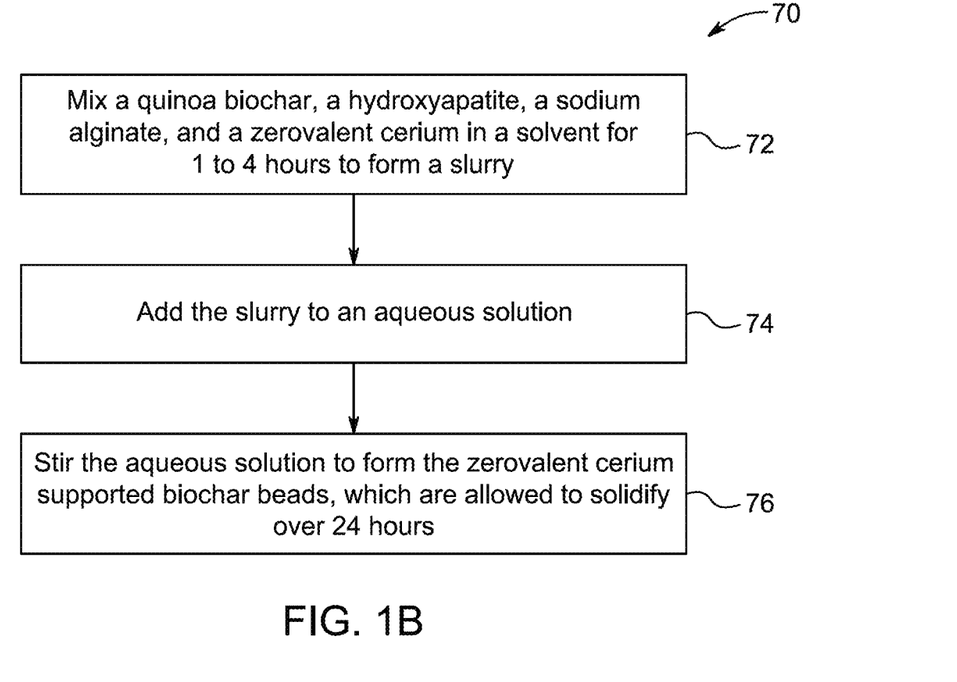
FIG. 1B is a flow chart depicting a method of making the zerovalent cerium supported biochar beads, according to certain embodiments.

FIG. 1B illustrates a schematic flow chart of a method 70 of making the catalyst. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes mixing a quinoa biochar, a hydroxyapatite, a sodium alginate, and a zerovalent cerium in a solvent for 1 to 4 hours, preferably 1.25 to 3.5 hours, preferably 1.5 to 3 hours, more preferably 1.75 to 2.5 hours, and yet more preferably about 2 hours to form a slurry. In some embodiments, the quinoa biochar may comprise stalks, fruit, leaves, roots, flowers, seeds, and any part of a quinoa plant may be used in the quinoa biochar. In some embodiments, biochar other than a quinoa biochar, such as any biomass biochar known in the art, may be used in place or in combination with the quinoa biochar. In some embodiments, the zerovalent cerium is prepared by a borohydride reduction of a cerium salt. In some embodiments, the cerium salt may include, but is not limited to, cerium (III) nitrate, cerium (IV) oxide, cerium (IV) sulfate, cerium (III) chloride, cerium (III) acetate, cerium (IV) ammonium nitrate, a combination thereof, and the like. In a preferred embodiment, the cerium salt is cerium sulfate. The addition of hydroxyapatite and sodium alginate helps stabilizes the slurry, while the quinoa biochar provides a porous, carbon-rich support for cerium to promote enhanced catalytic properties of the final product. In some embodiments, the mixing can be done by stirring, swirling, sonicating, a combination of techniques thereof, and the like to form the slurry.

At step 74, the method 70 includes adding the slurry to an aqueous solution. The aqueous solution includes calcium chloride. In some embodiments, the slurry is added to the aqueous solution is done dropwise with a syringe. In some embodiments, the slurry may be added to the aqueous solution using any technique known in the art. In some embodiments, the distance between a nozzle of the syringe and a surface of the aqueous solution is 1 to 5 cm, preferably 2 to 4 cm, more preferably 2.5 to 3.5 cm, and yet more preferably about 3 cm. A dropwise addition promotes controlled formation of beads with a uniform size and structure.

At step 76, the method 70 includes stirring the aqueous solution to form the zerovalent cerium supported biochar beads, which are allowed to solidify over 24 hours. The calcium chloride solution crosslinks the sodium alginate, resulting in stable beads that encapsulate the biochar and cerium, effectively preventing agglomeration and ensuring maximum catalytic surface area. After this process, the beads are separated, washed, and dried.

EXAMPLES

The following examples describe and demonstrate a method of catalytic degradation of phenylbutazone (PBZ) in water. The examples are provided solely for illustration and are not to be construed as limitations of the present disclosure, as many variations thereof are possible without departing from the spirit and scope of the present disclosure.

Example 1: Materials

All the chemicals used in the present disclosure are described hereinafter, with corresponding purity percentage (%), grade and supplier names, as listed in Table 1.

TABLE 1

Detailed specifications of the chemicals applied in the present disclosure

| S. No. | Chemical name | % Purity | Grade | Supplier |
|---|---|---|---|---|
| 1 | Perchloric acid | 60 | Analytical | Daejung Chemicals and Metals |
| 2 | Sodium borohydride | 99 | Analytical | Daejung Chemicals and Metals |
| 3 | Propane-2-ol | 99 | Analytical | BDH Limited England |
| 4 | Sodium nitrite | 96 | Analytical | BDH Limited England |
| 5 | Methanol | 99 | Analytical | Merck |
| 6 | Acetonitrile | 99.8 | Analytical | Merck |
| 7 | Sodium chloride | 99.5 | Analytical | Merck |
| 8 | Ethanol absolute | 99.8 | Analytical | Sigma Aldrich |
| 9 | Phenylbutazone | 98 | Analytical | Sigma Aldrich |
| 10 | Acetic acid | 99.8 | Analytical | Scharlab S.L Spain |
| 11 | Hydroxyapatite | 97 | Analytical | Sigma Aldrich |
| 12 | Calcium chloride | 97 | Analytical | Sigma Aldrich |
| 13 | Sodium alginate | 74 | Analytical | Sigma Aldrich |

Example 2: Synthesis of Zerovalent Cerium Beads Supported on Biochar (ZVCe/Biochar)

The ZVCe/biochar beads were synthesized by mixing 1 gram (g) of quinoa biochar, 2.5 g of hydroxyapatite (HA), 1.5 g of sodium alginate, and 10 g of zerovalent cerium (ZVCe). The ZVCe was first prepared using a borohydride reduction technique with cerium sulfate (CS). The quinoa biochar was prepared via known methods [Imran, M. et al. Effect of biochar modified with magnetite nanoparticles and $HNO_3$ for efficient removal of Cr(VI) from contaminated water: A batch and column scale study, *Environmental Pollution*, 2020, 261, 114231, which is incorporated herein by reference in its entirety]. The resulting slurry was stirred at room temperature for 2 hours to ensure homogeneity. A syringe was used to add the slurry dropwise with continuous stirring into a 300 milliliters (mL) solution of 3.0 molar (M)

calcium chloride ($CaCl_2$)). The distance between the syringe nozzle and the surface of the $CaCl_2$ solution was maintained at approximately 3.0 centimeters (cm). The as synthesized ZVCe/biochar beads were left in the $CaCl_2$ solution with slow stirring for 24 hours. Furthermore, the beads were separated, washed with distilled water (DW), and dried in an oven at 40° C. for 24 hours.

Example 3: Characterization of the Synthesized ZVCe/Biochar Beads

Figure 2A:
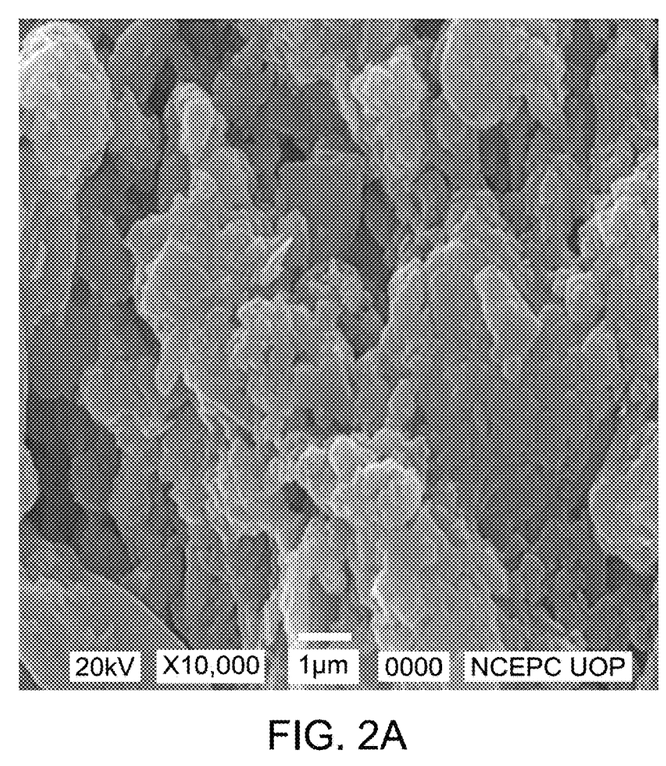
FIG. 2A is a scanning electron microscopy (SEM) image of biochar, with a scale of 1 micrometer (μm), according to certain embodiments.
Figure 2B:
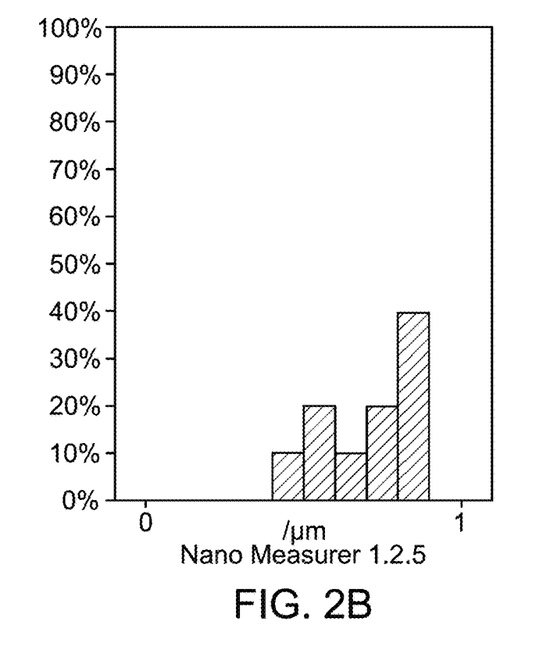
FIG. 2B is a distribution plot depicting particle size of the biochar, according to certain embodiments.
Figure 3A:
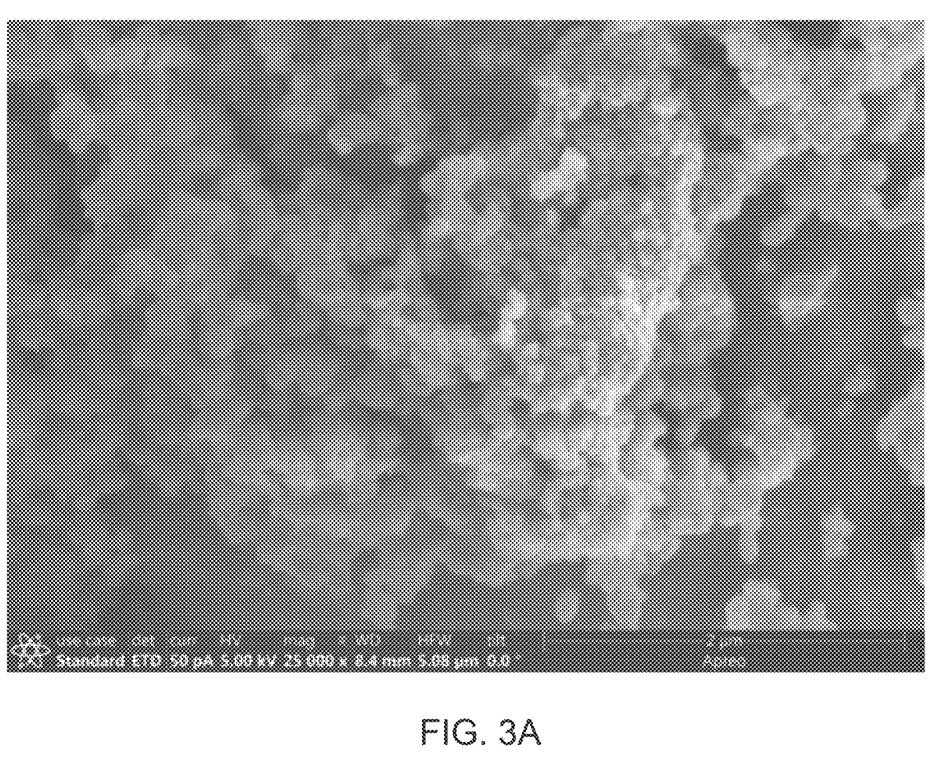
FIG. 3A is an SEM image of ZVCe/biochar composite, with a scale of 2 μm, according to certain embodiments.
Figure 3B:
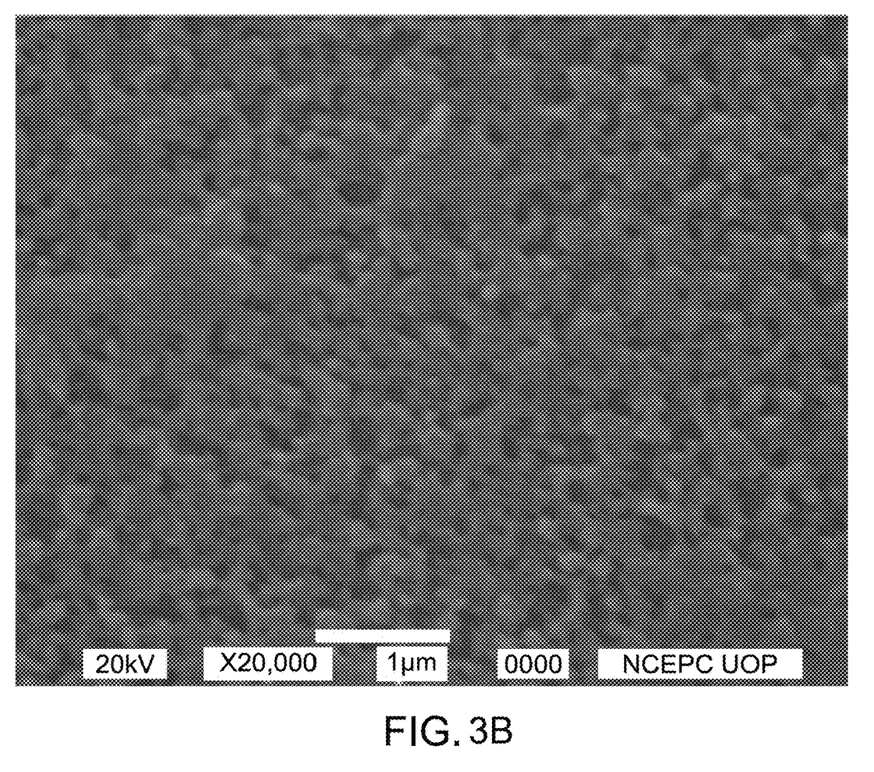
FIG. 3B is an SEM image of ZVCe/biochar composite, with a scale of 1 μm, according to certain embodiments.
Figure 3C:
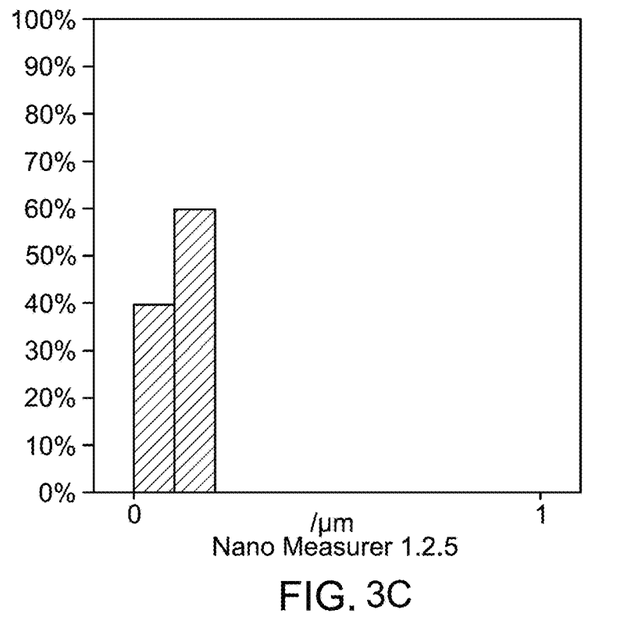
FIG. 3C is a distribution plot depicting particle size of ZVCe/biochar composite, according to certain embodiments.

Scanning electron microscopy (SEM) analysis was performed to evaluate the surface morphology of biochar, as shown in FIG. 2A. The SEM image revealed a rough and dispersed structure, with biochar particles exhibiting two-dimensional stacked, irregular shapes. The particle size frequency distribution plot, shown in FIG. 2B, indicates that the biochar particles are about 0.69 micrometers (μm) in size. Regarding the ZVCe/biochar composite, ZVCe was well-dispersed on the porous surface of biochar and a decrease in agglomeration is observed, as shown in FIGS. 3A-3B. The particles size distribution plot indicates that the particles were about 0.49 μm in size, as shown in FIG. 3C. A reduction in particle size of ZVCe when incorporated on biochar may be associated with the decrease in agglomeration. The obtained results indicate an increase in surface area and reactive sites, available for the target contaminant(s).

Figure 4:
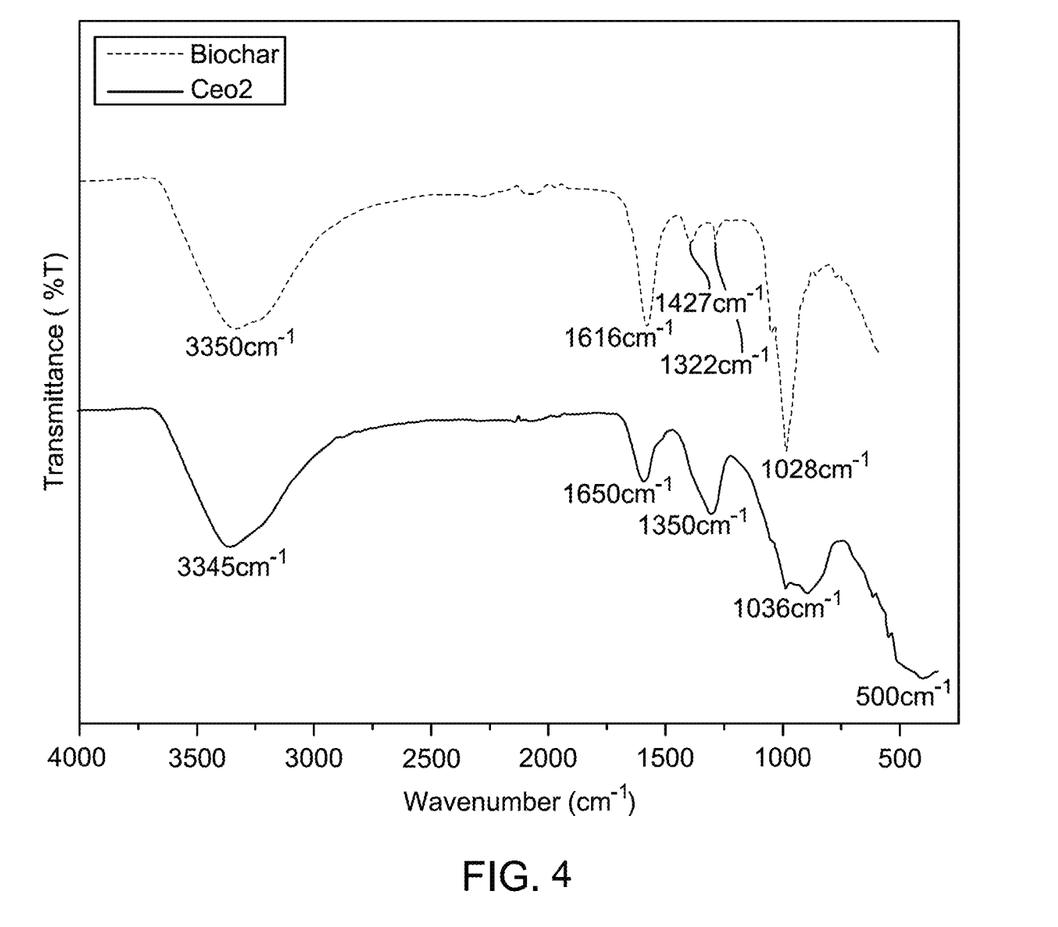
FIG. 4 depicts Fourier-transform infrared (FTIR) spectra of cerium oxide $(CeO_2)$ and the ZVCe/biochar composite, according to certain embodiments.

Fourier-transform infrared (FTIR) spectroscopy using a 103385 spectrophotometer with KBr disks was utilized to obtain absorption band spectra for cerium oxide ($CeO_2$) and the ZVCe/biochar composite, as shown in FIG. 4. At around 3345 $cm^{-1}$ and 1650 $cm^{-1}$, bands due to OH stretching and bending vibrations were detected. Bands around 1350 $cm^{-1}$ and 1036 $cm^{-1}$ corresponded to asymmetric stretching vibrations of C—O. A band at 3350 $cm^{-1}$ was due to alcoholic or phenolic OH group. The peak at 1616 $cm^{-1}$ was due to a bending vibration of OH group, and bands at approximately 1427 $cm^{-1}$ and 1322 $cm^{-1}$ were attributed to stretching vibrations of C=O groups. The prominent peak at 1028 $cm^{-1}$ may be attributed to a stretching of cellulosic or non-cellulosic C—O bonds, such as C—O—C and C—OH, present in biochar.

Figure 5:
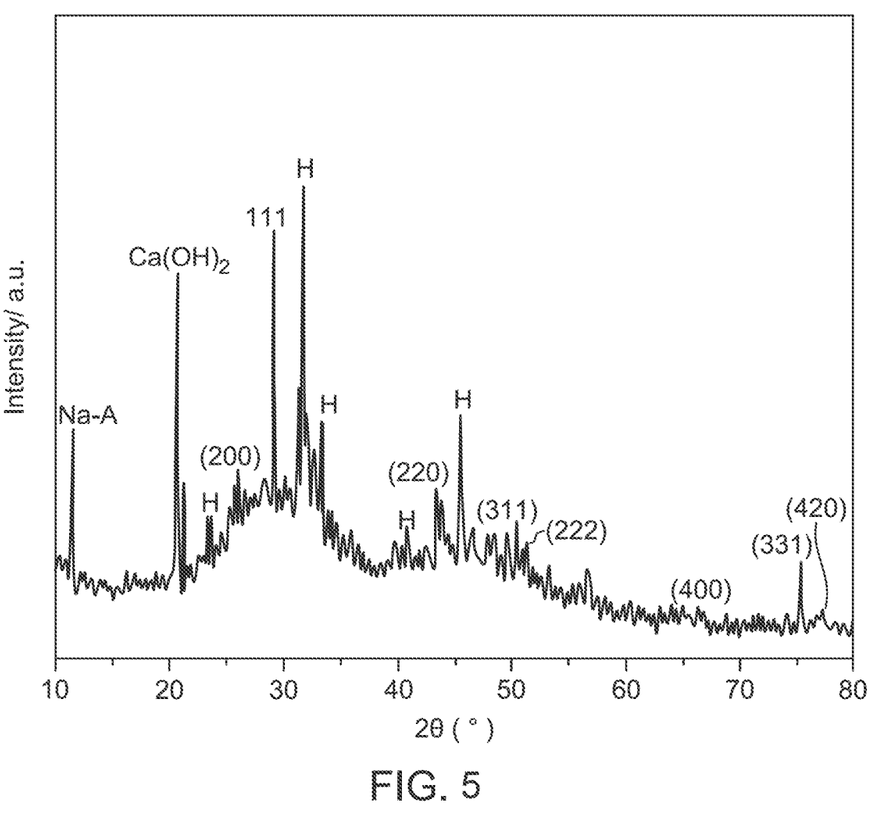
FIG. 5 depicts X-ray diffraction (XRD) analysis of the ZVCe/biochar composite, using a Cu-Kα radiation ($\lambda$=1.55 Å) at a scan rate of 0.02°/s (2θ), according to certain embodiments.

The crystallinity and composition of the ZVCe/biochar composite were measured using X-ray diffraction analysis with a Cu-Kα radiation source (λ=1.55 Å) and a scan rate of 0.02° (2θ/s). The composite was identified by diffraction peaks for cerium at 26°, 50.5°, 75.4° and 77° corresponding to the planes (200), (311), (331) and (420), respectively, as shown in FIG. 5. Furthermore, two peaks of hydroxyapatite were identified, along with low-intensity peaks of $Ca(OH)_2$ and sodium alginate at 22.8° and 11.8°, respectively. In addition, two prominent peaks of chlorapatite and chlorite were detected.

Figure 6:
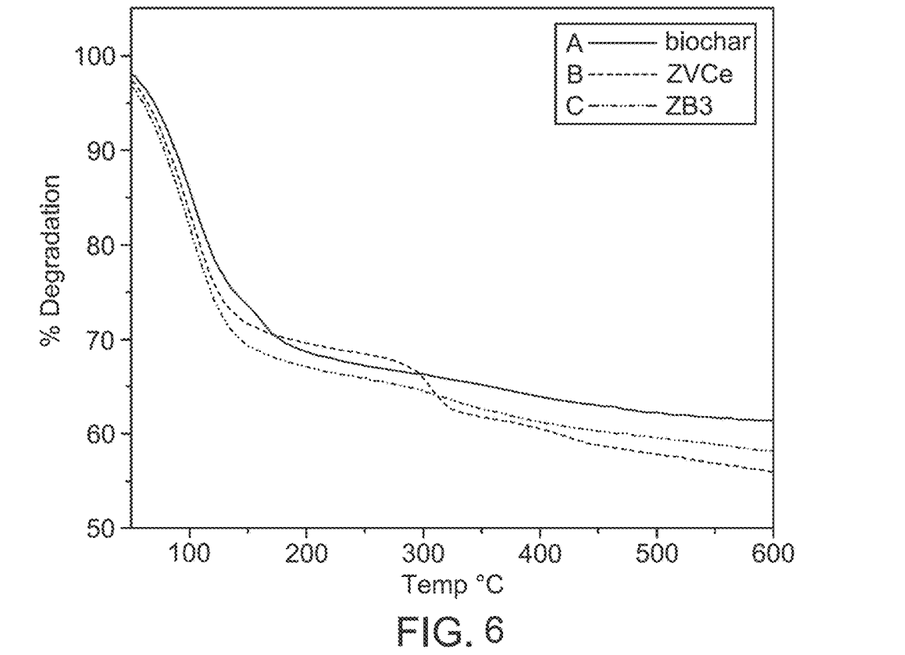
FIG. 6 is a graph depicting a thermogravimetric analysis (TGA) for biochar, ZVCe, and the ZVCe/biochar composite, according to certain embodiments.

According to the Barrett-Joyner-Halenda (BJH) model, the pores of the ZVCe/biochar composite were found in the range of 2.89 nm to 3.2 nm. The calculation suggests the mesoporous nature of the as-synthesized ZVCe/biochar. The surface area of ZVCe increased after the formation of a composite with biochar. The surface area of bare ZVCe was 38.889 square meters per gram ($m^2/g$) and increased to 58.027 $m^2/g$ after incorporating it on biochar. Thermogravimetric analysis measured the thermal stability of biochar, bare ZVCe, and ZVCe/biochar beads, as shown in FIG. 6. The initial weight loss of all three beads was due to ethanol or water molecules, which was the same in all beads. The biochar lost a maximum of 50% of its weight, due to containment of oxygen (O) and carbon (C) which may be burned to an oxide. The ZVCe/biochar was shown to be more thermally stable than the biochar and the bare ZVCe alone.

Example 4: Catalytic Performance of ZVCe/Biochar

Figure 7:
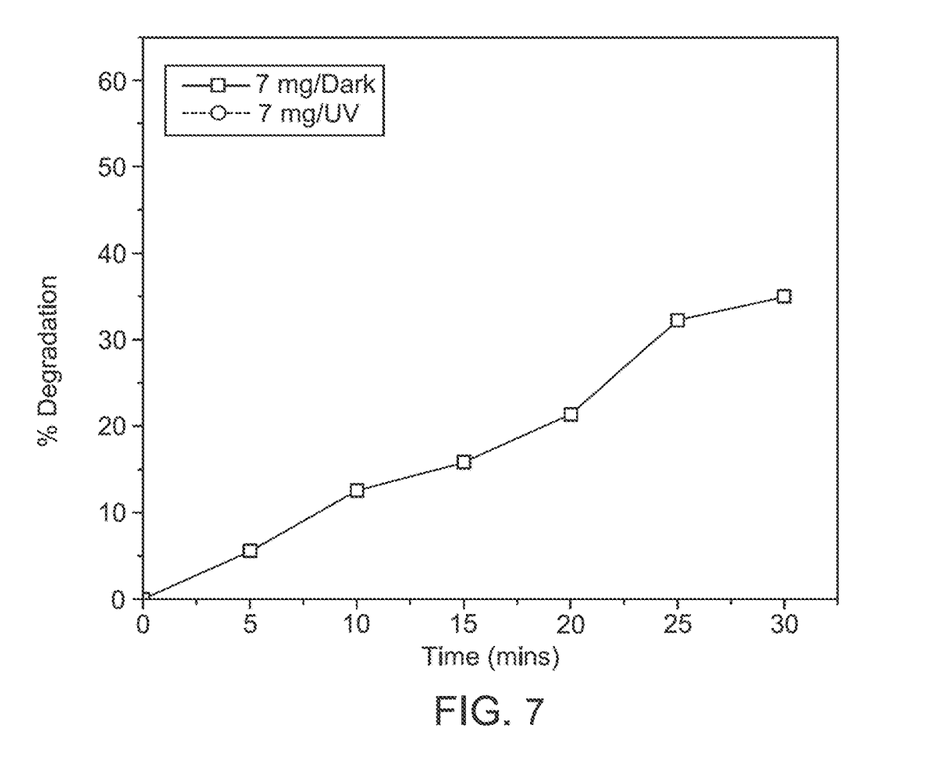
FIG. 7 is a graph depicting a catalytic performance of the ZVCe/biochar composite for removal of PBZ, according to certain embodiments.
Figure 8:
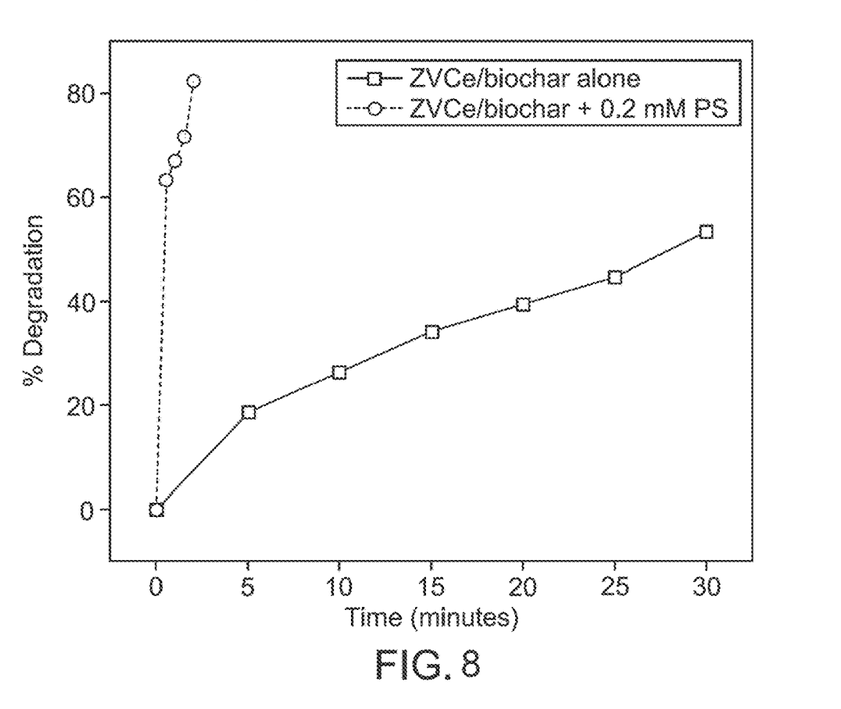
FIG. 8 is a graph depicting degradation of PBZ by the ZVCe/biochar composite with 0.2 millimolar (mM) persulfate, according to certain embodiments.

The catalytic performance of the ZVCe/biochar composite towards the degradation of phenylbutazone (PBZ) was evaluated using dark-assisted degradation experiments. In particular, 50 milliliters (mL) of PBZ standard solution of 5 milligrams per liter (mg/L) were taken in an 80 mL petri dish and continuously stirred for 30 minutes. The PBZ was removed by about 35% in the dark without any oxidant, as shown in FIG. 7. The HPLC measurements were done every 5 minutes when no persulfate (PS) was added and every 30 seconds when 0.2 mM of PS was added. The amount of catalyst was kept constant at 7 mg. The catalyst ZVCe/biochar degraded 53.45% of 5 mg/L PBZ in 30 minutes when no PS was added. 82.65% of PBZ degradation was achieved in the presence of 0.2 mM of PS, as shown in FIG. 8. The improved degradation of PBZ was due to higher rate of formation of (·OH/$SO_4^{-}$·) reactive radicals.

Figure 9:
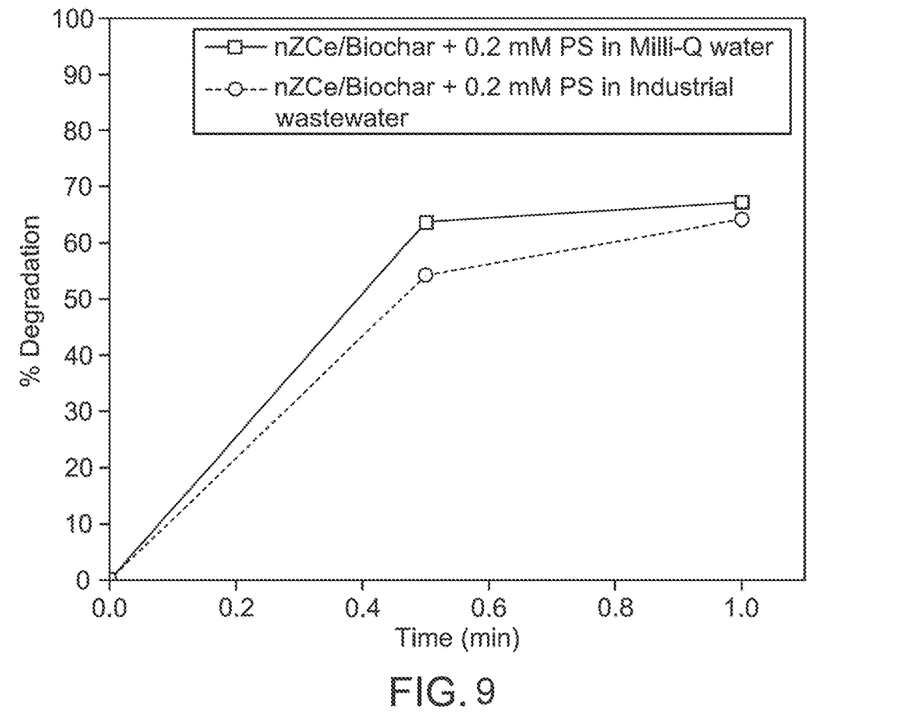
FIG. 9 is a graph depicting degradation of PBZ by the ZVCe/biochar composite with 0.2 mM persulfate in Milli-Q water and in industrial wastewater, according to certain embodiments.
Figure 10:
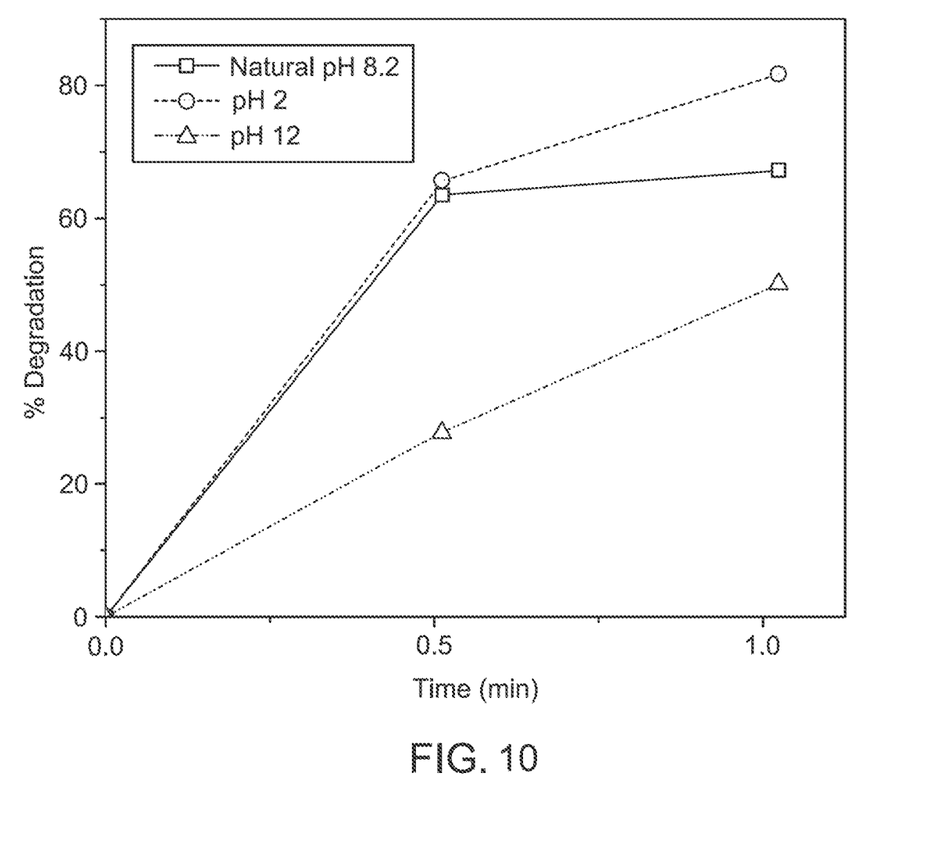
FIG. 10 is a graph depicting degradation of PBZ by ZVCe/biochar composite with 0.2 mM persulfate at a pH range of 2 to 12, according to certain embodiments.

An industrial sample from Medicraft Pharma Peshawar was also measured. The sample was effectively degraded, achieving the degradation of 64.03% after 1 minute for ZVCe/biochar composite with 0.2 mM PS, compared to approximately 67.14% degradation when Milli-Q water was used for the duration of 1 minute, as shown in FIG. 9. The variation in results was attributed to the presence of scavengers in the industrial sample, including nitrates, nitrites, carbonates, and bicarbonates. The ZVCe/biochar composite with 0.2 mM PS degraded PBZ effectively over the pH range of 2 to 12 which reflected a versatile environmental application of the ZVCe/biochar composite, as shown in FIG. 10.

Example 5: Analysis of Degradation Products

Figure 11:
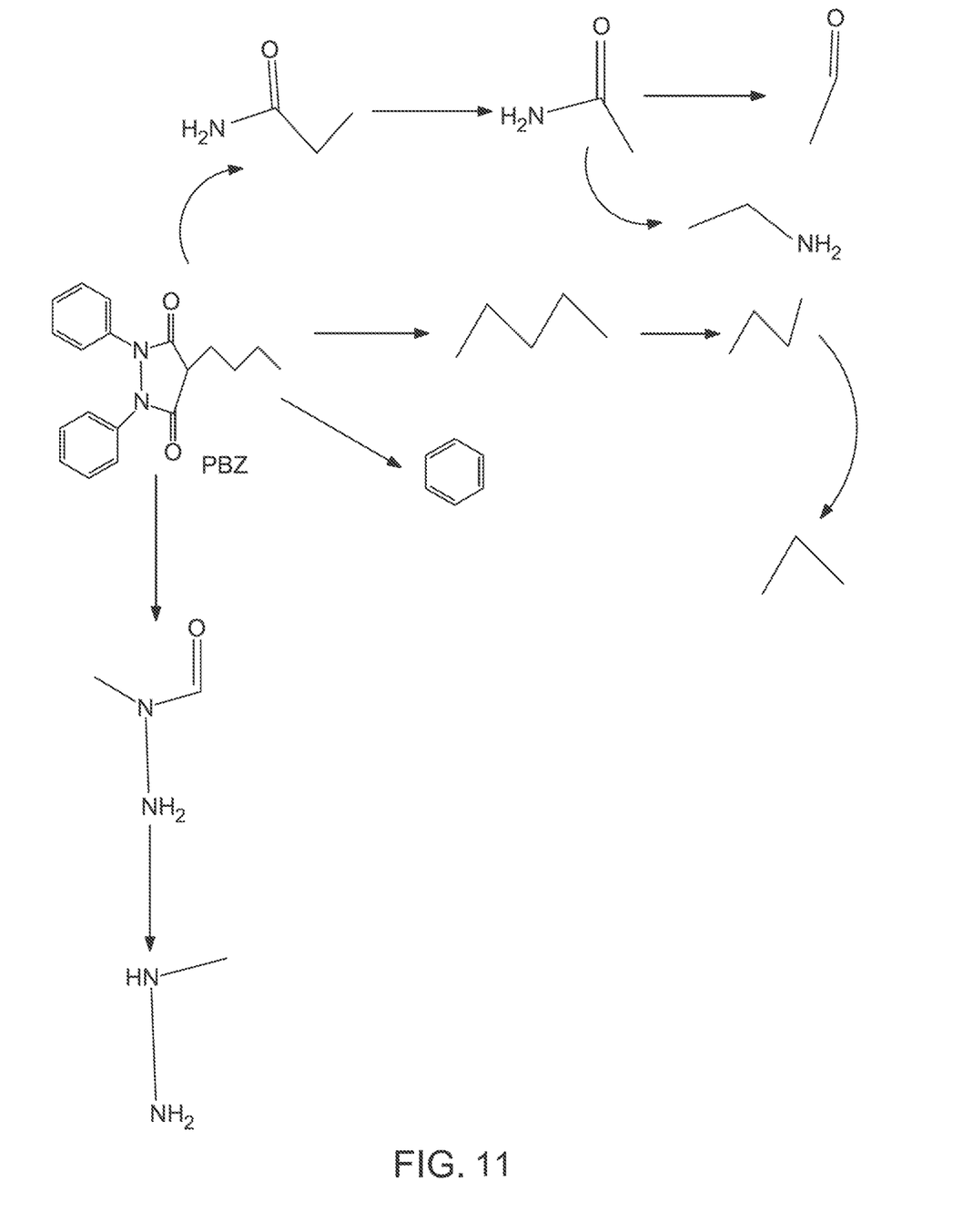
FIG. 11 is a schematic representation of a degradation mechanism of PBZ by the ZVCe/biochar composite in the presence of the persulfate anion, according to certain embodiments.

To identify the degradation products, gas chromatography-mass spectroscopy (GC-MS) analysis was conducted. The assessment of degradation products obtained on attack of the PBZ by the ZVCe/biochar composite and persulfate as listed in Table 2, provided information on the degradation mechanism, as shown in an exemplary scheme, provided in FIG. 11. Reactive and energetic radicals, such as ·OH or $SO_4^{-}$·, attacked the contaminants mainly through electron transfer, addition, substitution, and hydrogen abstraction reactions. Hydroxyl radicals (·OH) caused hydrogen abstraction or addition reactions and sulfate radicals ($SO_4^{-}$) reacted via an electron transfer mechanism. The first degradation product degradation product (DP1) had a mass-to-charge ratio (m/z) of about 78, due to attack of OH· on PBZ. The cleavage of PBZ molecule into fragments resulted in pentane, which was a second degradation product (DP2) with a m/z of about 74. The DP2 was further reduced to butane, which was a third degradation product (DP3) with a m/z of about 58. The DP3 was yet again reduced to propane which was a fourth degradation product (DP4) with a m/z of about 44. In addition, the degradation byproducts DP5 to DP10 formed via subsequent decarbonylation and decarboxylation of PBZ.

TABLE 2

Degradation products (DPs) obtained on attack of PBZ by

| No. | Chemical Structure | Chemical Formula | Abbreviated Form | m/z value |
|---|---|---|---|---|
| 1 | | Phenylbutazone | PBZ | 308 |
| 2 | | Benzene | DP1 | 78 |
| 3 | | Pentane | DP2 | 74 |
| 4 | | Butane | DP3 | 58 |
| 5 | | Propane | DP4 | 44 |
| 6 | | Propionamide | DP5 | 73 |
| 7 | | Acetamide | DP6 | 59 |
| 8 | | Ethanamine | DP7 | 45 |
| 9 | | Acetaldehyde | DP8 | 44 |
| 10 | | N-methylformohydrazine | DP9 | 74 |
| 11 | | 1-methylhydrazine | DP10 | 46 |

Example 6: Ecotoxicity Analysis

Effectiveness of a treatment method may depend on the toxicity of degradation products (DPs) produced thereinafter. European Union and Chinese hazard evaluation procedures were followed to ensure that the DPs produced pertaining to the present disclosure were less toxic than PBZ. In this regard, the chronic and acute toxicity values in mg/L, towards aquatic organisms, including fish, daphnia, and green algae, were evaluated using ECOSAR program, as listed in Table 3. It was noted from the obtained results that DP5, DP6, and DP7 were harmless, while the other degradation products (DPs) were harmful. The non-harmful DPs demonstrated an efficient green route for the degradation of PBZ.

TABLE 3

Ecotoxicity results

| | Acute toxicity | | | Chronic toxicity | | |
|---|---|---|---|---|---|---|
| | Fish | Daphnia | Green Algae | | | |
| Compound PBZ | ($LC_{50}$) Lethal conc. Duration 96 h | ($LC_{50}$) Lethal conc. Duration 48 h | ($EC_{50}$) Effective conc. Duration 96 h | Fish (ChV) Duration 96 h | Daphnia (ChV) Duration 48 h | Green Algae (ChV) Duration 96 h |
| DP1 | 65.1 | 36.9 | 27.4 | 6.36 | 3.60 | 7.18 |
| DP2 | 11.4 | 6.97 | 7.04 | 1.22 | 0.834 | 2.17 |
| DP3 | 25.4 | 14.8 | 12.4 | 2.56 | 1.56 | 3.46 |
| DP4 | 53.1 | 29.7 | 20.6 | 5.09 | 2.76 | 5.19 |
| DP5 | 2.48 | 3.61 | 114 | 10 | 224 | 22.3 |
| DP6 | 4.84 | 7.60 | 186 | 15.8 | 393 | 29.3 |
| DP7 | 223 | 20.7 | 28 | 27 | 1.33 | 7.77 |
| DP8 | 29.0 | 32.6 | 15.1 | 12.1 | 0.242 | 4.20 |
| DP9 | 12.8 | 6.91 | 2.31 | 66.0 | 6.90 | 0.201 |
| DP10 | 2.61 | 2.17 | 0.763 | 9.21 | 1.31 | 0.073 |

The mentioned chronic toxicities were assessed based on the Chinese hazard evaluation criteria for new chemical substances (HJ/T154-2004, which is incorporated herein by reference in its entirety). That is, ChV>10 (Not harmful), 1<ChV<10 (Harmful), 0.1<ChV<1 (Toxic), and ChV<0.1 (very toxic). Acute toxicityased on the European Union criteria (described in Annex VI of Directive 67/548/EEC, which is incorporated herein by reference in its entirety) as $LC_{50}$>100 or $EC_{50}$>100 (Not harmful), 10<$LC_{50}$<100 or 10<$EC_{50}$<100 (Harmful), 1<$LC_{50}$<10 or 1<$EC_{50}$<10 (Toxic), and $LC_{50}$<1 or $EC_{50}$<1 (very toxic).

Aspects of the present disclosure provided a method for catalytic degradation of PBZ in water with a ZVCe/biochar composite with persulfate (PS), which efficiently degraded organic contaminants in industrial wastewater. The composite ZVCe/biochar activates PS without the need for light or irradiation. The method, as described herein, effectively degrades PBZ in aqueous media. The ZVCe/biochar composite works efficiently over a pH range of 2 to 12. The degradation products of PBZ were less toxic and less harmful than PBZ. The composite beads may be recycled and reused.

The synthesis of ZVCe focused on catalytic properties of the ZVCe when immobilized on biochar in the form of beads. The as-prepared beads of ZVCe/biochar offer advantages, including desirable mobility, easy separation from the aqueous medium, and efficient degradation of PBZ. Morphological and surface analyses showed successful incorporation of ZVCe into biochar, with the catalyst exhibiting high surface area and pore volume. The catalytic degradation of PBZ followed pseudo-first-order kinetics according to the Langmuir-Hinshelwood model. The degradation performance of ZVCe/biochar at pH 8.2 (natural pH) and 0.2 mM PS for Milli-Q water and industrial water was 67.14% and 64.03% with $k_{app}$ values of 0.021 $min^{-1}$ and 0.018 $min^{-1}$, respectively.

Numerous modifications and variations of the present disclosure are possible in light of the above teachings. Therefore, it is to be understood that within the scope of the appended claims, the disclosure may be practiced other than as specifically described herein.

The invention claimed is:

1. A method of catalytic degradation of phenylbutazone in water, comprising:
contacting a catalyst and an oxidant with an aqueous solution comprising phenylbutazone,
wherein the catalyst comprises zerovalent cerium supported on biochar beads,
wherein the oxidant is a persulfate,
degrading the phenylbutazone during the contacting to form a degradation mixture comprising one or more degradation products,
wherein an amount of phenylbutazone in the degradation mixture is 15 to 20 wt. % of an amount of phenylbutazone in the aqueous solution.

2. The method of claim 1, wherein the catalyst is in the form of particles having an average diameter of 0.05 to 0.6 µm.

3. The method of claim 1, wherein the catalyst is porous and has an average pore diameter of 1 to 5 nm.

4. The method of claim 1, wherein the catalyst has a surface area of 55 to 60 $m^2/g$.

5. The method of claim 1, wherein the one or more degradation products are selected from a group consisting of benzene, pentane, butane, propane, propionamide, acetamide, ethanamine, acetaldehyde, N-methylformohydrazine, and 1-methylhydrazine.

6. The method of claim 1, wherein the aqueous solution has a pH of 2 to 12.

7. The method of claim 1, wherein an amount of the catalyst is 130 to 150 milligrams per liter (mg/L) of the aqueous solution.

8. The method of claim 1, wherein a concentration of the oxidant is 0.1 to 0.3 mM.

9. The method of claim 1, wherein 55 to 60% of an initial amount of the catalyst is stable up to a temperature of 600° C. by thermogravimetric analysis.

10. The method of claim 1, wherein the catalyst is not irradiated with light during the contacting.

11. The method of claim 1, wherein at least 60 wt. % of an initial amount of the phenylbutazone is degraded within 1 minute of contacting.

12. The method of claim 1, wherein at least 80 wt. % of an initial amount of the phenylbutazone is degraded within 5 minutes of contacting.

13. The method of claim 1, wherein the aqueous solution further comprises one or more salts.

14. The method of claim 1, wherein the aqueous solution has a pH of 6 to 9.

15. The method of claim 1, wherein the degrading occurs with a hydroxyl radical and/or a sulfate radical intermediate.

16. The method of claim 1, wherein the catalyst is made by a process, comprising:
mixing a quinoa biochar, a hydroxyapatite, a sodium alginate, and a zerovalent cerium in a solvent for 1 to 4 hours to form a slurry;
adding the slurry to an aqueous solution,
wherein the aqueous solution comprises calcium chloride,
stirring the aqueous solution to form the catalyst.

17. The method of claim 16, further comprising forming the zerovalent cerium by a borohydride reduction of a cerium salt.

18. The method of claim 17, wherein the cerium salt is cerium sulfate.

19. The method of claim 16, wherein adding the slurry to the aqueous solution is carried out dropwise with a syringe.

20. The method of claim 19, wherein a distance between a nozzle of the syringe and a surface of the aqueous solution is 1 to 5 cm.

* * * * *